Figures 1, 2:
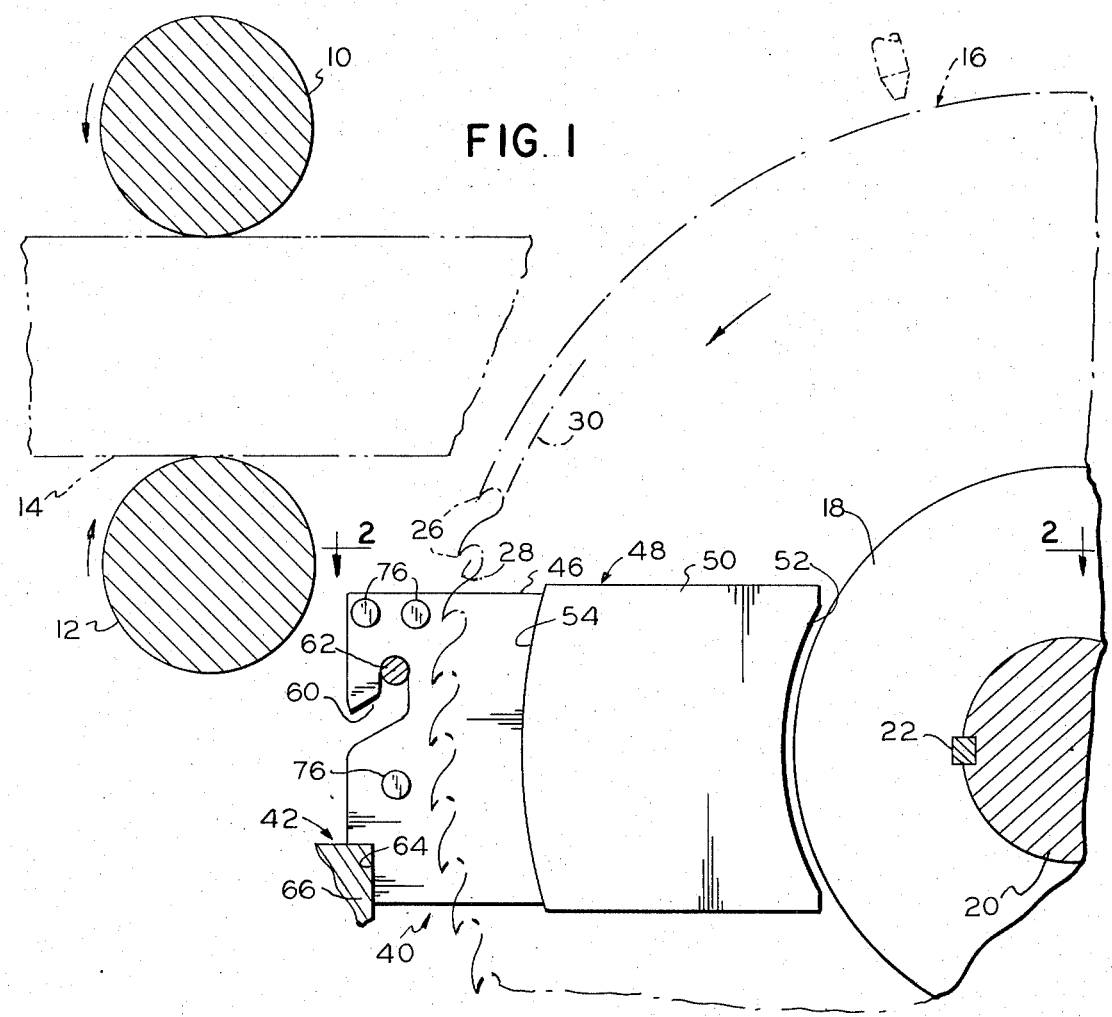

United States Patent [19]
Jones

[11] 3,817,143
[45] June 18, 1974

[54] EDGER
[75] Inventor: Aaron U. Jones, Eugene, Oreg.
[73] Assignee: Seneca Sawmill Company, Eugene, Oreg.
[22] Filed: June 14, 1972
[21] Appl. No.: 262,702

[52] U.S. Cl. ............................................. 83/823
[51] Int. Cl. ..................................... B27g 19/02
[58] Field of Search ............. 83/823, 821, 827, 829

[56] References Cited
UNITED STATES PATENTS
| | | | |
|---|---|---|---|
| 2,709,464 | 5/1955 | Kreidler | 83/823 |
| 3,285,302 | 11/1966 | Thrasher | 83/823 |
| 3,550,654 | 12/1970 | Thrasher | 83/823 |
| 3,566,934 | 3/1971 | Thrasher | 83/823 |
| 3,645,304 | 2/1972 | Thrasher | 83/823 |

Primary Examiner—Donald R. Schran
Attorney, Agent, or Firm—Klarquist, Sparkman, Campbell, Leigh, Hall & Whinston

[57] ABSTRACT

A pair of saw guides having planar bearing surfaces engaging opposite faces of a very thin circular saw from a point spaced substantially inward from the gullet line of the saw almost to axially shiftable saw collars mounting the saw on a driving arbor. The bearing surfaces are planes and have arcuate edges concentric with the arbor, and the inner edges of the guides, in effect, bracket the collars so that the guides can shift the thin saw and the collars along the arbor without bending the saw.

10 Claims, 2 Drawing Figures

EDGER

DESCRIPTION

This invention relates to an improved edger, and more particularly to an improved saw guide construction.

An object of the invention is to provide a new and improved edger.

Another object of the invention is to provide a new and improved saw guide construction.

A further object of the invention is to provide a saw guide construction for very accurately guiding and shifting a thin saw blade.

Another object of the invention is to provide a saw guide construction having a pair of bearings engaging opposite sides of a thin circular saw mounted shiftably by collars on an arbor, with the bearings extending partially around the collars.

Another object of the invention is to provide a saw guide construction in which a pair of guides having planar bearing surfaces have arcuate inner edges positioned close to and extending partly around collars mounting a circular saw on an arbor.

Another object of the invention is to provide a saw guide construction in which a pair of opposed guides have arcuate outer edges spaced substantially inwardly from a gullet line of a circular saw engaged by the guides.

In the drawings:

FIG. 1 is a fragmentary, vertical sectional view of an improved edger forming one embodiment of the invention; and FIG. 2 is a fragmentary, horizontal sectional view taken along line 2—2 of FIG. 1.

Referring now in detail to the drawings, there is shown therein an improved edger forming one embodiment of the invention and including a pair of feed rolls 10 and 12 engaging opposite sides of a cant 14 and pushing the cant through a plurality of very thin circular saws 16 mounted by pairs of collars 18 splined to an arbor 20 by splines 22. Each saw has a body 24 and teeth 26 separated by gullets 28, the bottoms of the gullets lying on gullet line 30 of the saw.

To hold the saws 16 precisely in place and to prevent any lateral shifting of the saws and collars 18 during sawing and to shift the very thin saws and collars along the arbor 20 when it is desired to change the spacings between the saws, pairs of saw guides mounted on rigidly held shiftable mounts 42 of setworks 44 are provided. Each guide 40 has a thick, rigid, bar-like plate 46 around and on opposite sides of which is cast a bearing 48 of babbitt having identical, planar bearing faces 50. The bearing 48 has an arcuate inner edge 52 concentric with the collars 18 and spaced close to and bracketing (extending partially around) the adjacent collar. That is, the collar projects into the bearing. The bearing also has an arcuate outer edge 54 centered on the arbor and spaced substantially inwardly from the gullet line 30 for clearance for chips and splinters.

The plates 46 have slots 60 (FIG. 1), which hook over rods 62 of the mounts 42, and also have notches 64, which fit on bars 66 of the mounts 42. A set screw 68 (FIG. 2) is screwed through a tapped bore 70 in a fixed plate 72 of the mount and engages the adjacent plate 46 to press it toward the other plate 46. This presses three gauging bosses 74 brazed to the plate 46 against three, aligned, identical gauging bosses 76 brazed to the other plate 46 and presses the other ends of the bosses 76 against a fixed plate 78 of the mount 42 to hold the plates 48 rigidly on the mount 42. The bosses 74 and 76 are equal in height and extend beyond the adjacent faces of the plate 46 a distance just sufficiently greater than the distance each bearing face 50 is spaced from the adjacent face of the plate 46 that there is very little or no clearance between the face 50 and the body 24 of the saw 16. Preferably there is no clearance but there may be from one to three thousandths of an inch total clearance between the two faces 50 and the two faces of the body 24. In one constructed embodiment of the invention, there was no clearance, and there was sufficient friction between each pair of the saw guides 40 and the saw 16 that a fairly strong pull of a few pounds on the periphery of the saw was required to overcome the friction. Thus, the bearing faces 50 hold the intermediate portion of the blade rigidly against lateral shifting and only the outer portion of the saw can move laterally at all, and lateral movement of this outer portion is substantially eliminated by operating the saws at high peripheral speed. The saws and guides are sprayed with water during sawing to provide cooling and lubrication.

The saw guides 40 are perfectly symmetrical, and may be interchanged with each other. Thus, when the bearing faces 50 engaging the saw become somewhat worn after several weeks use, the two guides may be reversed to use the other two bearing faces 50. The faces 50 and ends of the gauging bosses 76 may be milled to refurbish the guides.

The collars 18 have very close clearances relative to the arbor; there being just sufficient clearance to permit easy shifting of the collars along the saws, about 0.005 inch clearance being preferred. The shifting is done by actuation of the setworks 42 while the saw is running but, of course, not sawing, and since the bearing faces are concentric to the collars and extend beyond the adjacent portions of the collars and are quite close to the collars, there is no tendency to bend the saw even though it is very thin. Preferably the edges 52 are spaced only about one-quarter of an inch from the peripheries of the collars. The width (radial dimension) of each bearing surface 50 is great, in one constructed embodiment, for saws of from 23 to 26 inches in diameter, the width of each bearing surface was 5 inches. In this saw the edge 54 was about one-half inch from the gullet line 30 when the saw was 23 inches in diameter and was much farther, about 2 inches for a saw of 26 inches in diameter. The kerf width of the saw was 0.085 inch, the thickness of the body 24 of the saw was 0.040 inch and the spacing between the pair of plates 46 was 0.20 inch, the radial width of the collars 18 being about 4 inches.

What is claimed is:

1. In an edger,
   a thin circular saw,
   an arbor,
   collar means of a predetermined diameter splined to the arbor and mounting the saw,
   means for guiding a cant along a predetermined path to the saw and chordally past a portion of the saw radially outwardly from one portion of the collar means,
   and a pair of saw guides each having points of contact radially outward from and extending in a curve around a portion of the collar means, to an extent whereby a line between the ends of the guide defines a chord of the collar means each of the saw guides subtending an arc of the collar means substantially less than one-half the periphery of the collar means and positioned wholly at one side of said path.

2. The edger of claim 1 wherein the saw guides are planar and have arcuate inner edges spaced close to and extending partially around the collar means.

3. The edger of claim 1 wherein the saw guides have extreme radially outward portions engaging the saw at points spaced radially inwardly from the gullet line of the saw.

4. The edger of claim 1 wherein there is substantially no clearance between the saw guides and the saw.

5. The edger of claim 1 wherein each saw guide has a bearing face having arcuate, concentric inner and outer edges.

6. The edger of claim 5 wherein the clearance between the bearing faces and the adjacent portions of the saw is not greater than about 0.003 inch.

7. The edger of claim 5 wherein there is substantially no clearance between the bearing faces and the saw.

8. The edger of claim 5 wherein the outer edges of the bearing faces are spaced substantially inwardly from the gullet line of the saw.

9. The edger of claim 8 wherein the inner edges of the bearing faces are spaced closely to and extend partially around the collar means.

10. The edger of claim 7 wherein the radial dimension of each bearing face is in the order of one-half of the radius of the saw.

* * * * *